(12) United States Patent
Wang

(10) Patent No.: US 9,908,308 B2
(45) Date of Patent: Mar. 6, 2018

(54) METHOD FOR THE ADHESION OF A LAYER OF FLUOROSILICONE RUBBER TO A LAYER OF SILICONE RUBBER

(71) Applicant: Dow Corning (China) Holding Co., Ltd., Shanghai (CN)

(72) Inventor: Shaohui Wang, Shanghai (CN)

(73) Assignee: DOW CORNING (CHINA) HOLDING CO., LTD., Shanghai (CN)

( * ) Notice: Subject to any disclaimer, the term of this patent is extended or adjusted under 35 U.S.C. 154(b) by 936 days.

(21) Appl. No.: 14/363,406

(22) PCT Filed: Nov. 12, 2012

(86) PCT No.: PCT/CN2012/084439
§ 371 (c)(1),
(2) Date: Jun. 6, 2014

(87) PCT Pub. No.: WO2013/082989
PCT Pub. Date: Jun. 13, 2013

(65) Prior Publication Data
US 2014/0335296 A1 Nov. 13, 2014

(30) Foreign Application Priority Data

Dec. 8, 2011 (CN) .......................... 2011 1 0406819
Nov. 12, 2012 (WO) ................ PCT/CN2012/084439

(51) Int. Cl.
| | |
|---|---|
| B32B 25/08 | (2006.01) |
| B32B 25/04 | (2006.01) |
| C08J 5/12 | (2006.01) |
| C09J 5/06 | (2006.01) |
| B32B 25/20 | (2006.01) |
| B32B 1/08 | (2006.01) |
| C08L 83/04 | (2006.01) |
| F16L 11/04 | (2006.01) |
| B32B 37/18 | (2006.01) |
| C08G 77/12 | (2006.01) |
| C08G 77/16 | (2006.01) |
| C08G 77/20 | (2006.01) |

(52) U.S. Cl.
CPC .............. *B32B 25/042* (2013.01); *B32B 1/08* (2013.01); *B32B 25/20* (2013.01); *B32B 37/185* (2013.01); *C08J 5/121* (2013.01); *C08J 5/124* (2013.01); *C08J 5/128* (2013.01); *C08L 83/04* (2013.01); *C09J 5/06* (2013.01); *F16L 11/045* (2013.01); *B32B 2250/24* (2013.01); *B32B 2270/00* (2013.01); *B32B 2305/72* (2013.01); *B32B 2305/77* (2013.01); *B32B 2319/00* (2013.01); *B32B 2597/00* (2013.01); *C08G 77/12* (2013.01); *C08G 77/16* (2013.01); *C08G 77/20* (2013.01); *C08J 2383/07* (2013.01); *C08J 2383/08* (2013.01); *C08J 2483/07* (2013.01); *C08J 2483/08* (2013.01); *C09J 2483/00* (2013.01); *C09J 2483/006* (2013.01); *Y10T 428/1393* (2015.01)

(58) Field of Classification Search
CPC ...... C09J 183/04; C09J 183/06; B32B 27/283
USPC ........................................................ 428/447
See application file for complete search history.

(56) References Cited

U.S. PATENT DOCUMENTS

| | | | | |
|---|---|---|---|---|
| 4,332,844 A | * | 6/1982 | Hamada | .................... C08J 5/124 156/329 |
| 7,572,514 B2 | * | 8/2009 | Howe | ...................... B05D 1/38 428/446 |

(Continued)

FOREIGN PATENT DOCUMENTS

| | | |
|---|---|---|
| CN | 102168500 A | 8/2011 |
| CN | 102241936 A | 11/2011 |
| EP | 798344 A2 * | 10/1997 |

(Continued)

OTHER PUBLICATIONS

International Search Report for Application No. PCT/CN2012/084439 dated Feb. 28, 2013, 5 pages.

(Continued)

*Primary Examiner* — Marc Zimmer
(74) *Attorney, Agent, or Firm* — Howard & Howard Attorneys PLLC

(57) ABSTRACT

A method for the adhesion of a layer of fluorosilicone rubber which is curable using a non-hydrosilylation curing process to a layer of silicone rubber which contains no perfluoroalkyl groups and which is curable using a non-hydrosilylation curing process, comprising the steps of:
(i) incorporating either a hydrosilylation catalyst or a siloxane containing at least two silicon bonded hydrogen groups into the fluorosilicone rubber composition prior to curing and;
(ii) incorporating the other of the hydrosilylation catalyst or the siloxane containing at least two silicon bonded hydrogen groups into the alternative silicone rubber composition prior to curing;
(iii) preparing a mixture compound comprising the products of step (i) and step(ii) and having a weight ratio of the product of step (i) to the product of step (ii) in the range of 40:60 to 60:40;
(iv) forming the products of step (i), (ii), and step (iii) into required shapes;
(v) bringing the shaped products of step (iv) into contact with the product of step
(iii) between the product of step (i) and product of step (ii); and
(vi) adhering the shaped products in contact with each other together by curing the products of step (v).

11 Claims, 1 Drawing Sheet

(56) References Cited

U.S. PATENT DOCUMENTS

2006/0281875 A1* 12/2006 Uno ..................... C08L 83/08
525/477
2008/0308227 A1   12/2008 Drake et al.

FOREIGN PATENT DOCUMENTS

| EP | 23316872 A2 * | 5/2011 |
| JP | H 03-017169 A | 1/1991 |
| JP | 2002047473 A * | 2/2002 |

OTHER PUBLICATIONS

English language abstract and machine-assisted English translation for CN 102168500 extracted from espacenet.com database on Jul. 22, 2014, 12 pages.

English language abstract and machine-assisted English translation for CN 102241936 extracted from espacenet.com database on Jul. 22, 2014, 13 pages.

English language abstract for JPH 03-017169 extracted from PAJ database on Jul. 22, 2014, 1 page.

* cited by examiner

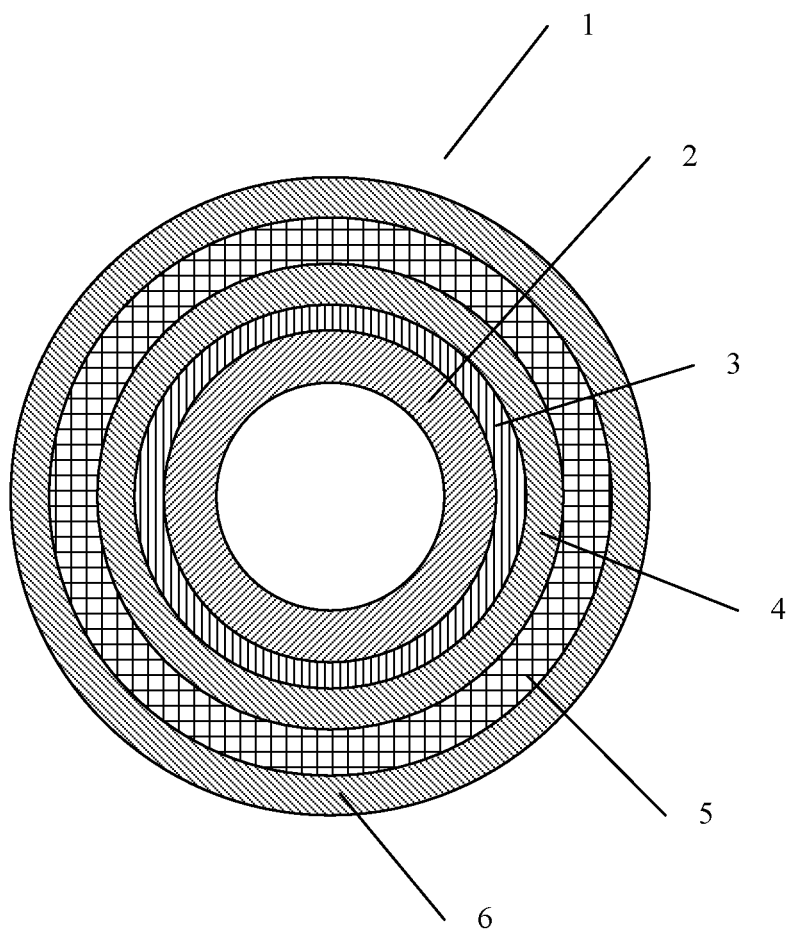

METHOD FOR THE ADHESION OF A LAYER OF FLUOROSILICONE RUBBER TO A LAYER OF SILICONE RUBBER

CROSS-REFERENCE TO RELATED APPLICATIONS

This application is the National Stage of International Patent Application No. PCT/CN2012/084439, filed on Nov. 12, 2012, which claims priority to and all the advantages of Chinese Patent Application No. CN 201110406819.4, filed on Dec. 8, 2011, the content of which is incorporated herein by reference.

TECHNICAL FIELD

The present invention relates to an enhanced method for the adhesion of a fluorosilicone rubber which is curable using a non-hydrosilylation curing process to an alternative silicone rubber which is curable using a non-hydrosilylation curing process and to products made using said method.

BACKGROUND ART

Fluorosilicone rubber compositions, particularly those which are based on an organopolysiloxane polymer having a large proportion of fluoroalkyl, particularly perfluoroalkyl groups, when cured, possess properties rendering them resistant to heat, frost, chemicals, and exposure to oil. These compositions are therefore widely used in the automotive and aircraft industries. However, one major problem with cured fluorosilicone rubber is that it does not adhere well to other substrates such as other silicone rubber compositions.

Various methods have been proposed for improving adhesion of fluorosilicone rubbers to alternative silicone rubber based substrates and other substrate surfaces. These include the addition of materials containing multiple silicon-hydrogen bonds or multiple alkenyl groups in either the fluorosilicone rubber and/or other silicone rubber to enhance adhesion. The introduction of adhesion promoters such as cyanurate and/or isocyanurate based compounds for example triallyl cyanurate or triallyl isocyanurate in either the fluorosilicone rubber and /or other silicone rubber may also be used but can result in compatibility problems.

In US2008/0308227A, a method for the adhesion of a layer of fluorosilicone rubber which is curable using a non-hydrosilylation curing process to a layer of silicone rubber which contains substantially no perfluoroalkyl groups is disclosed. The method comprises the steps of:
i) incorporating either a hydrosilylation catalyst or a siloxane containing at least two silicon bonded hydrogen groups into the fluorosilicone rubber composition prior to curing and;
ii) incorporating the other of the hydrosilylation catalyst or the siloxane containing at least two silicon bonded hydrogen groups into the alternative silicone rubber composition prior to curing;
iii) forming the products of step (i) and step (ii) into required shapes;
iv) bringing the shaped products of step (iii) into contact with each other; and
v) adhering the shaped products in contact with each other together by effecting a hydrosilylation reaction therebetween.

SUMMARY OF THE INVENTION

In a first embodiment of the present invention there is provided a method for the adhesion of a layer of fluorosilicone rubber which is curable using a non-hydrosilylation curing process to a layer of silicone rubber which contains substantially no perfluoroalkyl groups and which is curable using a non-hydrosilylation curing process, comprising the steps of:
i) incorporating either a hydrosilylation catalyst or a siloxane containing at least two silicon bonded hydrogen groups into the fluorosilicone rubber composition prior to curing and;
ii) incorporating the other of the hydrosilylation catalyst or thesiloxane containing at least two silicon bonded hydrogen groups into the alternative silicone rubber composition prior to curing;
iii) preparing a mixture compound comprising the products of step (i) and step(ii) and having a weight ratio of the product of step (i) to the product of step (ii) in the range of 40:60 to 60:40;
iv) forming the products of step (i), (ii), and step (iii) into required shapes;
v) bringing the shaped products of step (iv) into contact with the product of step (iii) between the product of step (i) and product of step (ii); and
vi) adhering the shaped products in contact with each other together by curing the products of step (v).

In a preferred embodiment, the product of step (iii) is remain un-cured prior to step (vi).

In another preferred embodiment, all of the product of step (i), the product of step (ii), and the product of step (iii) remain un-cured prior to step (vi).

In another preferred embodiment, pressure is applied on to the interface between the products of step (iv) prior to and/or during step (vi).

In another preferred embodiment, step (vi) is undertaken at a temperature between room temperature up to 200° C.

In another preferred embodiment, the hydrosilylation catalyst is a platinum group metal based catalyst selected comprising a platinum, rhodium, iridium, palladium or ruthenium based catalyst.

In another preferred embodiment, the silicon bonded hydrogen containing siloxane is a linear structure with silicon bonded hydrogen radicals as represented by the formula $$Me_3SiO(Me_2SiO)_r[R''CH_2CH_2Si(Me)O]_t(MeHSiO)_zSiMe_3$$

wherein each R'' may be the same or different and denotes a branched or linear perfluoroalkyl radical having from 1 to 8 carbon atoms, the value of r is zero or greater than zero and the values of t and z are each greater than zero and are such that the fluorosilicone polymer contains from 1 to 10 mol % hydrogen bonded siloxane units, at least 5 mol % fluorinated siloxane units and the balance dimethylsiloxane units and the-chain curing radicals as represented by the formula noted immediately above wherein the value of r is zero and the values of t and z are each greater than zero and are such that the fluorosilicone polymer contains from 20 to 50 mol % fluorinated siloxane units and has a viscosity of from 10 to 10000 mPa·s at 25° C.

In another preferred embodiment, the silicon bonded hydrogen containing siloxane comprises
$HMe_2SiO(MeHSiO)_m[R''QSi(Me)O]_fSiMe_2H$
$HMe_2SiO(MeHSiO)_m(R''QHSiO)_fSiMe_2H$
$R''QMeHSiO(MeHSiO)_m(R''QHSiO)_fSiMeHRQ$
$Me_3SiO(Me_2SiO)_{0.95m}(MeHSiO)_{0.05m}(R''QMeSiO)_fSiMe_3$
$HMe_2SiO(Me_2SiO)_m(R''QMeSiO)_fSiMe_2H$
$HMeR''QSiO(R''QMeSiO)_fSiMeR''QH$
$Me_2R''QSiO(R''QMeSiO)_{0.95f}(R''QHiSiO)_{0.05f}$  and Me₃SiO(Me₂SiO)$_m$(R"QMeSiO)$_{0.90}$(R"QHSiO)$_{0.10}$SiMe₃ wherein the viscosity of the polymer ranges from that of a freely flowing liquid to a slowly flowing gum and m and f have values of from zero to 10,000 and more.

In another preferred embodiment, the fluorosilicone rubber composition comprises (A) 100 parts by weight of a polyorganosiloxane which has a weight average molecular weight greater than 100,000 and comprises fluorinated siloxane units, and non fluorinated siloxane units in the polymer; said fluorinated siloxane units having the formula (R"Q)$_a$(R')$_b$ SiO$_{(4-a-b)/2}$ and said non-fluorinated siloxane units having the formula (R')$_c$SiO$_{(4-c)/2}$ where, in said fluorinated and non-fluorinated siloxane units, R" denotes a branched or linear perfluoroalkyl radical having from 1 to 8 carbon atoms, Q denotes a divalent hydrocarbon, hydrocarbon ether or hydrocarbon thioether radical linking the R" radical to a silicon atom through at least 2 carbon atoms, R' denotes a saturated or unsaturated silicon-bonded, monovalent hydrocarbon group, wherein a=1 to 2, b=0-2 and c=0 to 3, (B) 5 to 200 parts by weight of a suitable filler;

(E) a fluorosilicone polymer containing an average of at least two silicon-bonded hydrogen radicals per molecule; and (C) 0.1 to 10 parts by weight of an organic peroxide.

(D) 0 to 20 parts of a second polyorganosiloxane which has a weight average molecular weight greater than 100,000 and the average unit formula R¹$_y$SiO$_{(4-y)/2}$, in which R¹ is a substituted or non-substituted monovalent hydrocarbon group which may be unsaturated, but does not contain any fluoro substituents, and y is a number of 1.96 to 2.03.

In another preferred embodiment, the silicone rubber composition which may be used comprises
(i) an organopolysiloxane any of the types described in Component (E);
(ii) a filler or group of fillers any of the types described in Component (B);
(iii) a curing agent of any type defined as Component (C);
(iv) a hydrosiltlation catalyst of any of the types described in Component (F); and
   optional additives selected from the group of one or more rheology modifiers, pigments, colouring agents, antiadhesive agents, plasticizers, adhesion promoters, blowing agents, fire retardants and dessicants and the like.

In a second embodiment of the present invention there is provided a hose comprising a fluorosilicone rubber adhered to silicone rubber by means of the above method.

BRIEF DESCRIPTION OF DRAWINGS:

FIG. 1 shows a typical turbocharger hose.

DISCLOSURE OF THE INVENTION

In one embodiment of the present invention either or both the product of step (i) or the product of step (ii) may be pre-cured prior to step (vi). Alternatively both the product of step (i) and the product of step (ii) are cured simultaneously with the product of step (iii) in step (vi). The product of step (iii) is preferably remain un-cured prior to step (vi). If required, pressure may be applied when adhering the three products together. The pressure can be applied by using a mould, a bandage or with autoclave apparatus. The reaction at the interface between the fluorosilicone rubber product and the mixture compound and the interface between the high consistency silicone rubber product and the mixture compound may take place at room temperature or at any temperature from room temperature up to about 200° C.

The fluorosilicone polymer composition utilised in step (i) may be any suitable fluorosilicone rubber composition.

Preferably the fluorosilicone polymer composition comprises the following components
A) a fluorinated polydiorganosiloxane polymer;
B) one or more reinforcing and/or non-reinforcing fillers
C) a suitable non-hydrosilylation cure catalyst Preferably the fluorinated polydiorganosiloxane A has a weight average molecular weight greater than 100,000, and/or a viscosity of at least 10,000 mPa·s at 25° C. and comprises fluorinated siloxane units, and optionally non fluorinated siloxane units. Weight average molecular weight can be measured by Gel Permeation Chromatography (GPC) with poly styrene standard. The fluorinated siloxane units preferably have the formula

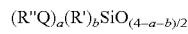
(R"Q)$_a$(R')$_b$SiO$_{(4-a-b)/2}$ wherein
each R" may be the same or different and denotes a branched or linear fluoroalkyl radical having from 1 to 8 carbon atoms;
each Q may be the same or different and denotes a divalent hydrocarbon containing at least two carbon atoms, a hydrocarbon ether or a hydrocarbon thioether. Each R" radical is linked to a silicon atom via a Q group,
each R' is the same or different and denotes an optionally substituted saturated or unsaturated silicon-bonded, monovalent hydrocarbon group,
wherein a=0 to 2, b=0 to 2 and when a is 0 at least one R' group per unit contains one or more carbon-fluorine bonds.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Examples of suitable saturated R' radicals include C₁ to C₁₀ alkyl radicals, such as methyl, ethyl, propyl, isopropyl, butyl, hexyl, 2-ethylhexyl, octyl, isooctyl and decyl. Preferably, when a is >0 at least 90 percent, and more preferably with the exception of alkenyl radicals, all of the R' radicals in the fluorosilicone polymer are methyl radicals.

Preferably when a is 0, on average about at least one R' per unit contains at least one carbon-fluorine bond and most preferably is CF₃—.

Preferably R" denotes a fluoroalkyl radical having from 1 to 8 carbon atoms, over the complete range of from 5 to 100 mol % fluorinated siloxane units. Each fluoroalkyl radical present has at least one —C—F bond. The R" radicals can be identical or different and can have a normal or a branched structure. Preferably at least some, most preferably at least 50% of the fluoroalkyl groups are perfluoroalkyl groups. Examples thereof include CF₃—, C₂F₅—, C₃F₇—, such as CF₃CF₂CF₂— or (CF₃)₂CF—, C₄F₉—, such as CF₃CF₂CF₂CF₂—, (CF₃)₂CFCF₂—, (CF₃)₃C— and $CF_3CF_2(CF_3)CF-$; $C_5F_{11}$ such as $CF_3CF_2CF_2CF_2CF_2-$, $C_6F_{13}-$, such as $CF_3(CF_2)_4CF_2-$; $C_7F_{14}-$, such as $CF_3(CF_2CF_2)_3-$; and $C_8F_{17}-$.

Each perfluoroalkyl radical is bonded to a silicon atom by way of Q, a divalent spacing radical containing carbon, hydrogen and, optionally, oxygen and/or sulphur atoms which are present as ether and thioether linkages, respectively. The sulphur and oxygen atoms, if present, must be bonded to only carbon atoms.

Each Q radical can have any structure containing the elements listed; however, each is preferably an $C_1$ to $C_{10}$ alkylene radical having a normal or branched structure. Examples of suitable alkylene radicals include $-CH_2CH_2-$, $-CH_2CH_2CH_2-$, $-CH(CH_3)CH_2-$, $(CH_2CH_2)_2-$ and $-CH(CH_3)CH_2CH_2-$.

Each fluorinated radical, R"Q, preferably has the formula R"$CH_2CH_2-$.

Optionally the fluorinated polyorganosiloxane additionally comprises a proportion, preferably of less than 25%, more preferably less than 15% of the total number of units per molecule of non-fluorinated siloxane units having the formula $$(R''')_c SiO_{(4-c)/2}$$

wherein R''' denotes an optionally substituted saturated or unsaturated silicon-bonded, monovalent hydrocarbon group, wherein c=0 to 3 but preferably the average value of c is about 2. Each R''' contains no fluorine (and therefore R''' cannot contain any of the fluoro containing substituents mentioned in the general definition of "substituted groups" above.

As previously indicated R''' denotes an optionally substituted saturated or unsaturated silicon-bonded, monovalent hydrocarbon group. Preferably each R''' may be the same or different and are selected from $C_1$ to $C_{10}$ alkyl groups; $C_2$ to $C_8$ alkenyl groups such as vinyl or allyl groups; and/or aryl groups such as phenyl, tolyl, benzyl, beta-phenylethyl, and styryl. Preferably at least two R''' substituents per molecule are alkenyl groups, most preferably vinyl groups.

In one preferred embodiment of the invention the fluorosilicone polymer contains at least two alkenyl groups having from 2 to 8 carbon atoms, preferably vinyl groups.

Examples of Component A include copolymers of dimethylsiloxy units and (3,3,3-trifluoropropyl) methylsiloxy units; copolymers of dimethylsiloxy units, (3,3,3-trifluoropropyl)methylsiloxy units, and vinylmethylsiloxy units; copolymers of (3,3,3-trifluoropropyl)methylsiloxy units and vinylmethylsiloxy units; and poly(3,3,3-trifluoropropyl) methylsiloxane. The terminal group on the molecular chains thereof being selected from a trimethylsiloxy group, vinyldimethylsiloxy group, dimethylhydroxysiloxy group, and (3,3,3-trifluoropropyl)methylhydroxysiloxy group.

Any suitable filler or combination of fillers (Component (B)) may be utilized. These may include reinforcing fillers alone or in combination with non-reinforcing fillers. Reinforcing fillers include ground silica, fumed silica, precipitated silica, silica aerogels, calcium carbonate. Non-reinforcing fillers include wollastonite, quartz, kaolin, mica, pyrophylite magnesium carbonate and other particulate inorganic solids.

Component (B) may be introduced into the composition in a treated or untreated form. Treated fillers have been pre-treated with materials which provide the filler(s) with hydrophobic properties to aid in the filler/polymers mixing process. In some instances it may be beneficial to treat the fillers in situ in which case treating agent will be added to the composition of the present invention during the mixing process. Any suitable treating agent may be utilised. These may include for example one or more of the group comprising silanes, silazanes or short chain organopolysiloxane polymers. Some suitable silanes include, for example, alkyltrialkoxysilanes such as methyltriethoxysilane, methyltrimethoxysilane, phenyl trialkoxysilanes such as phenyltrimethoxysilane, or alkenyltrialkoxysilanes such as vinyltriethoxysilane, and vinyltrimethoxysilane. If desired, silazanes can also be used as treating agents for the kaolin filler, such as hexamethyldisilazane; 1,1,3,3-tetramethyldisilazane; and 1,3-divinyltetramethyldisilazane. Short chain organopolysiloxanes might for example include hydroxy terminated polydimethylsiloxanes having a degree of polymerisation of from 2 to 20, hydroxy terminated polydialkyl alkylalkenylsiloxanes having a degree of polymerisation of from 2 to 20 and organopolysiloxanes comprising at least one Si—H group, which may or may not be a terminal group. Short chain hydroxy terminated poly3,3,3-trifluoropropylmethylsiloxanes. Fluoroalkyltrialkoxysilanes and fluoroalkylsilanes may alternatively be utilised as the treating agents.

Preferred fillers are reinforcing fillers such as comprise fumed silica, precipitated silica, including rice hull ash and to a degree calcium carbonate and/or kaolin. Non-reinforcing fillers such as crushed quartz, diatomaceous earths, barium sulphate, iron oxide, titanium dioxide and carbon black, talc, wollastonite may also be used. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite It is preferable that this filler have a pH below 9. Furthermore, for obtaining a sufficient reinforcement effect, the reinforcing filler preferably have a specific surface area greater than 50 $m^2/g$. The filler amount is from 5 to 200 parts by weight, and preferably 20 to 80 parts by weight, per 100 parts by weight of component (A). If the amount of the filler exceeds 200 parts by weight, the fluorosilicone rubber will lose its mechanical properties after processing and curing.

Any suitable organic peroxide may be utilized as component (C), of the present invention. Some commonly used organic peroxides include benzoyl peroxide, 1,4-dichlorobenzyl peroxide, 2,4-dichlorobenzyl peroxide, 1,4-dimethylbenzyl peroxide, 2,4-dimethylbenzyl peroxide, di-t-butyl peroxide, dicumyl peroxide, tertiary butylperbenzoate, monochlorobenzoyl peroxide, ditertiary-butyl peroxide, 2,5-bis-(tertiarybutyl-peroxy)-2,5-dimethylhexane, 1,1-bis(t-butylperoxy)-3,3,5-trimethylcyclohexane, tertiary-butyl-trimethyl peroxide, n-butyl-4,4-bis(t-butylperoxy) valerate, 1,1-bis(t-butylperoxy)-3,3,5-trimetylcyclohexane, t-butylperoxyisopropylcarbonate, and t-butyl perbenzoate. The most suitable peroxide based curing agents are benzoyl peroxide, 2,4-dichlorobenzoyl peroxide, di-t-butyl peroxide, and dicumyl peroxide.

This component may also be formed into a paste by dispersing in a silicone oil. It is recommended that component (C) be used in an amount of 0.1 to 10 parts by weight, preferably 0.5 to 2.0 parts by weight, per 100 parts by weight of component (A).

The composition may also comprise 0 to 20 parts of component (D) a second polyorganosiloxane which has a weight average molecular weight greater than 100,000 and the average unit formula $R^1{}_y SiO_{(4-y)/2}$, in which $R^1$ is a substituted or non-substituted monovalent hydrocarbon group which may be additionally unsaturated e.g. with alkenyl or alkynyl groups, but does not contain any fluorionated groups, and y is a number of 1.96 to 2.03. Weight average molecular weight can be measured by Gel Permeation Chromatography (GPC) with poly styrene standard. For example, when component (A) is poly(3,3,3-trifluoropropyl)methylsiloxane, our claimed composition may also be combined with optional component (D) in the form of an organopolysiloxane which has a weight average molecular weight greater than 100,000 and which does not contain 3,3,3-trifluoropropyl groups. Organic groups which are bonded to silicon atoms in the polyorganosiloxane are represented by $C_1$ to $C_{10}$ alkyl groups; $C_2$ to $C_8$ alkenyl groups such as vinyl group or allyl group; and aryl groups such as phenyl group. The following are specific examples of these polyorganosiloxanes: polydimethylsiloxane, polyvinylmethylsiloxane, a copolymer of dimethylsiloxy units and methylphenylsiloxy units, and a copolymer of dimethylsiloxy units and vinylmethylsiloxy units. It is recommended that the polyorganosiloxanes be used in such an amount that, after compounding, the content of 3,3,3-trifluoropropyl groups in relation to all monovalent hydrocarbon groups bonded to silicon atoms be at least 20 mole %.

The essential ingredients of the fluorosilicone rubber composition of the present invention are components (A), (B), and (C) and optionally (D). If necessary, however, this composition is combined with the following additives: plasticizers such as diorganosiloxane oligomers normally used with silicone rubber compositions; metal soaps or processing aids; iron oxide, titanium oxide, magnesium oxide, magnesium carbonate or oil resistance improvers;. Other additional components may be included in the composition in accordance with the invention include chain extenders, dyes, colorants, pigments, viscosity modifiers, bath-life extenders, inhibitors, solvents, fire retardancy agents mould release agents blowing agents, flame retardants, electrically and/or thermally conductive fillers, and desiccants, handling agents, peroxide cure co-agents, acid acceptors, and UV stabilisers and flexibilisers. Suitable fire retardant agents include for example halogenated compounds, phosphates and antimony (III) oxide. Heat stabilisers such as cerium oxide and carbon black may also be used.

The fluorosilicone rubber composition of the present invention may be prepared by any suitable method, such as for example uniformly mixing components (A) to (C) and (D) when present, with appropriate additives when necessary, in conventional mixing equipment such as a two-roll kneader-mixer. Alternatively, It is possible to premix components (A) and (B) by mixing them under heating conditions to obtain a fluorosilicone rubber base compound which is then combined with component (C).

When the resulting composition is cured the applicant has found that such a cured fluorosilicone gives surprisingly improved oil resistance aging results and good adhesion to other cured siloxane rubber substrates.

The silicone rubber utilised in step (ii) is a high consistency Silicone rubber (HCR) composition. Usually, a a high consistency Silicone rubber (HCR) composition has a weight average molecular weight greather than 100,000 and/or viscosity of greater than 1,000,000 mPa*s at 25° C. Weight average molecular weight can be measured by Gel Permeation Chromatography (GPC) with poly styrene standard. The silicone rubber although it may alternatively comprise a silicone modified organic rubber comprising any suitable organic rubber such as for example butyl rubber, ethylene vinyl acetate rubber, EPDM, nitrile rubber and the like.

Typically a high consistency silicone rubber composition comprises an organopolysiloxane polymer (A1) having units of the general formula $R_aSiO_{4-a/2}$ wherein each R may be the same or different and denotes a hydrocarbon group having from 1 to 18 carbon atoms, a substituted hydrocarbon group having from 1 to 18 carbon atoms or a hydrocarbonoxy group having up to 18 carbon atoms. Preferably R is an optionally substituted alkyl, alkenyl, aryl, alkaryl or aralkyl group having up to 8 carbon atoms. The alkyl group can be, for example, methyl, ethyl, n-propyl, n-butyl, sec-butyl, and tert-butyl. The alkenyl group can be, for example, vinyl, allyl, propenyl, and butenyl. The aryl and aralkyl groups can be, for example, phenyl, tolyl, and benzoyl. The preferred groups are methyl, ethyl, phenyl and vinyl. Preferably at least 80% of all R groups are methyl or phenyl groups, most preferably methyl. The organopolysiloxanes are preferably those in which the value of a is 2 for practically all units, except for the terminal groups units, and the siloxanes are substantially linear polymers. The viscosity of such organopolysiloxanes may be many millions mPa·s at 25° C., in which case they are typically referred to as gums as they do not readily flow and as such maybe defined in terms of plasticity.

A high consistency rubber composition in accordance with the above typically additionally comprises a filler (B1) and a suitable catalyst (C1). Typically (B1) and (C1) are the same as components (B) and (C) described above for the fluorosilicone rubber composition. The silicone rubber composition may also comprise any of the optional additives described above with respect to the fluorosilicone rubber composition.

The high consistency silicone rubber composition may be prepared by any suitable method, such as for example uniformly mixing components (A1) to (C1) with appropriate additives when necessary, in conventional mixing equipment such as a two-roll kneader-mixer. Alternatively, It is possible to premix components (A1) and (B1) by mixing them under heating conditions to obtain a fluorosilicone rubber base compound which is then combined with component (C1).

The inventors have found that there is no preference as to which of the compositions contain the siloxane containing at least two silicon bonded hydrogen groups (henceforth referred to as component (E)) and which composition contains the hydrosilylation catalyst (henceforth referred to as component (F)) providing that neither composition contains both the siloxane containing at least two silicon bonded hydrogen groups and the catalyst. Hence, when component (E) is present in the silicone rubber composition, the fluorosilicone rubber contains component (F) and vice versa.

Any suitable siloxane containing at least two silicon bonded hydrogen groups may be used as component (E) in either the fluorosilicone rubber composition or the high consistency rubber composition. The amount of hydrogen atoms bonded to silicon atoms in component (E) is 0.2 weight percent or greater, and preferably 0.4 weight percent or greater. If the amount of silicon-bonded hydrogen atoms of component (E) is less than 0.2 weight percent, the adhesion to the substrate will be impaired.

In component (E), groups other than silicon-bonded hydrogen atoms are represented by substituted or non-substituted monovalent hydrocarbon groups such as $C_1$ to $C_6$ alkyl groups; aryl group such as phenyl; and perfluoro groups such as 3,3,3-trifluoropropyl and/or 1,1,1,2,2,3,3,4,4,-nonafluorohexyl groups. Component (E) normally has a linear or cyclic molecular structure, but it can also be partially branched or three-dimensional. It is recommended that component (E) have a degree of polymerization greater than 5 and preferably within the range of 10 to 150.

The following are Examples of Component (E): polymethylhydrogensiloxane; a copolymer of methylhydrogensiloxy units and dimethylsiloxy units; and a copolymer of methylhydrogensiloxy units, dimethylsiloxy units, and perfluoroalkyl (e.g. 3,3,3-trifluoropropyl and/or 1,1,1,2,2,3,3,4, 4,-nonafluorohexyl groups)methylsiloxy units. Terminal groups of the molecular chain of component (E) are represented by a trimethylsiloxy group or a dimethylhydrogensiloxy group. It is recommended that the amount of component (E) be within the range of 0.01 to 10 parts by weight, per 100 parts by weight of the silicone rubber polymer. Component (E) may be free of alkenyl based or acetylenic unsaturation.

Preferably, component (E) when present in the high consistency silicone rubber composition does not contain any fluoro containing groups.

When component (E) is present in the fluorosilicone rubber composition, component (E) may but need not contain perfluoroalkyl groups. However, the presence of perfluoroalkyl groups in component (E) in the fluorosilicone rubber composition may be advantageous as the presence of such groups may make component (E) significantly more compatible with the fluorosilicone rubber composition.

Component (E) which optionally contains one or more fluoroalkyl groups may comprise a fluorosilicone polymer containing an average of at least two silicon-bonded hydrogen radicals per molecule Preferably component (E) additionally comprises at least 2 mol%, based on the total number of siloxane units in the fluorosilicone polymer, of fluorinated siloxane units, any remaining siloxane units in the polymer being non-fluorinated siloxane units; said fluorinated siloxane units having the formula $(R''Q)(R^2)_x(H)_eSiO_{(3-x-e)/2}$ and said non-fluorinated siloxane units having the formula $(R^2)_g(H)_d SiO_{(4-g-d)/2}$ where, in said fluorinated and non-fluorinated siloxane units, R", Q are as defined above and $R^2$ denotes a silicon-bonded, monovalent hydrocarbon radical free of aliphatic unsaturation and x=0 to 2, e=0 to 2, x+e=0 to 2, g=0 to 3, d=0 to 3 and g+d=0 to 3.

Such a fluorosilicone based Component (E) used in the fluorosilicone rubber composition of the present invention is an organopolysiloxane consisting essentially of silicon-bonded hydrogen radicals, fluorinated siloxane units and, optionally, non-fluorinated siloxane units.

In component (E) by fluorinated siloxane units, it is meant siloxane polymer units that bear a perfluoroalkyl radical suitably bonded to a silicon atom. The fluorinated siloxane units have the formula $(R''Q)(R^2)_x(H)_eSiO_{(3-x-e)/2}$, general examples of which include chain-terminating siloxane units having the formula $(R''Q)(R^2)_x(H)_eSiO_{1/2}$, where the sum of x+e is 2, such as $(R''Q)(R')_2SiO_{1/2}$, $(R''Q)(H)_2SiO_{1/2}$ and $(R''Q)(R^2)(H)SiO_{1/2}$, chain-extending siloxane units having the formulae $(R''Q)(R^2)SiO_{2/2}$ and $(R''Q)(H)SiO_{2/2}$ and chain-branching siloxane units having the formula $(R''Q) SiO_{3/2}$. Alternatively component C may be $(R''Q)_2(R^2)_x(H)_e SiO_{(1-x-e)/2}$ where x and e are both =0 to 1 and x+e=0 to 1

Each fluorinated radical, R"Q, preferably has the formula $R''CH_2CH_2$— and in the case of Component (E) the R" radicals need be no larger than the $CF_3CF_2CF_2CF_2$—.radical in order to have a fluorosilicone polymer that provides the desirable adhesion properties when cured in the composition of the present invention. Accordingly, the fluorosilicone polymers that are to be used in the curable compositions of this invention preferably contain fluorinated siloxane units delineated above whose R"Q radicals have the structure $CF_3CF_2CF_2CF_2Q$-, and most preferably $CF_3CF_2CF_2CF_2CH_2CH_2$— or $(CF_3)_2CFCH_2CH_2CH_2$—.

The non-fluorinated siloxane units, if present, have the formula $(R''')_g(H)_dSiO_{(4-g-d)/2}$, general examples of which include chain-terminating siloxane units having the formula $(R''')_g(H)_dSiO_{1/2}$ where the sum of g+d is 3, such as $(R''')_3 SiO_{1/2}$, $(R''')_2(H)SiO_{1/2}$, $(R''')(H)_2SiO_{1/2}$ and $(H)_3SiO_{1/2}$, chain-extending siloxane units having the above formula where the sum of c+d is 2, such as $(R''')_2SiO_{2/2}$, and $(R''')(H)SiO_{2/2}$ and $(H)_2SiO_{2/2}$ and chain-branching siloxane units having the above formula where the sum of g+d is 1 or 0, such as $(R''')SiO_{3/2}$, $(H)SiO_{3/2}$ and $SiO_{4/2}$. It is to be appreciated that each $R^2$ and R''' may be the same groups.

As previously discussed $R^2$ denotes a silicon-bonded, monovalent hydrocarbon radical free of aliphatic unsaturation. Preferably each $R^2$ may be the same or different and denotes a silicon-bonded monovalent hydrocarbon radical, preferably having form 1 to 10 carbon atoms. Examples of suitable $R^2$ radicals include alkyl radicals, such as methyl, ethyl, propyl, isopropyl, butyl, hexyl, 2-ethylhexyl, octyl, isooctyl and decyl; aryl, such as phenyl, tolyl, benzyl, beta-phenylethyl, and styryl. Preferably at least 90 percent, and preferably all, of the $R^2$ radicals in the fluorosilicone polymer are methyl radicals.

Although component (E) can have any viscosity up to several million mPa·s (at 25° C.), it is believed necessary that the polymer not be a non-fluid, such as a gel or a solid. Therefore, said chain-branching siloxane units, if present, should be present in only minor amounts.

Specific examples of said selected siloxane units include, but are not limited to $Me_3SiO_{1/2}$, $Me_2HSiO_{1/2}$, $R''QMe_2SiO_{1/2}$, $R''QMeHSiO_{1/2}$, $Me_2SiO_{2/2}$, $MeHSiO_{2/2}$, $R''QMeSiO_{2/2}$ and $R''QHSiO_{2/2}$ where R" is, for example, perfluorobutyl.

General examples of preferred component (E) when containing fluoro groups include, but are not limited to, the following:

$HMe_2SiO(MeHSiO)_m[R''QSi(Me)O]_fSiMe_2H$
$HMe_2SiO(MeHSiO)_m(R''QHSiO)_fSiMe_2H$
$R''QMeHSiO(MeHSiO)_m(R''QHSiO)_fSiMeHRQ$
$Me_3SiO(Me_2SiO)_{0.95m}(MeHSiO)_{0.05m}(R''QMeSiO)_f SiMe_3$
$HMe_2SiO(Me_2SiO)_m(R''QMeSiO)_fSiMe_2H$
$HMeR''QSiO(R''QMeSiO)_fSiMeR''QH$
$Me_2R''QSiO(R''QMeSiO)_{0.95f}(R''QHiSiO)_{0.05f}$ and
$Me_3SiO(Me_2SiO)_m(R''QMeSiO)_{0.90f}(R''QHSiO)_{0.10f} SiMe_3$ wherein the viscosity of the polymer ranges from that of a freely flowing liquid to a slowly flowing gum and m and f have values of from zero to 10,000 and more.

Preferably, any fluoro-containing component (E) has a linear structure with silicon bonded hydrogen radicals as represented by the formula $Me_3SiO(Me_2SiO)_r[R''CH_2CH_2Si(Me)O]_t(MeHSiO)_z SiMe_3$ wherein the value of r is zero or greater than zero and the values of t and z are each greater than zero and are such that the fluorosilicone polymer contains from 1 to 95 mol % hydrogen bonded siloxane units, at least 5 mol% fluorinated siloxane units and the balance dimethylsiloxane units and has a viscosity of from 10 to 10000 mPa·s at 25° C.

In the above formula for the siloxane units, the values of x, e, g and d denote integers, the values of which are as delineated.

The values of m, f, r, t and z for the linear fluorosilicone polymer denote average values, as is well known in the art, and are such that the polymer contains the requisite amount of fluorinated siloxane units and has the desired viscosity at 25° C. The values of m, f, m+f, r, t, z and r+t+z thus will vary greatly, depending on the fluorinated siloxane unit content, the structure of the fluorinated radicals and the viscosity of the polymer. As the mol percent of fluorinated siloxane units in the polymer and/or the size of the fluorinated radicals therein increases, the viscosity of the polymer increases.

While the values of r, t and z can be as small as one, the values of r and t can range to 10,000 and more and the value of z typically is limited to a fraction, such as from $\frac{1}{100}$ to $\frac{2}{10}$, of the sum of r+t+z.

Most preferably fluoro-containing component (E) is a trimethylsiloxy terminated methyl perfluoroalkyl methylhydrogen siloxane. Most preferably the perfluoroalkyl group is a perfluorobutylethyl group or the like.

It is recommended that the amount of component (E) be within the range of 0.01 to 10 parts by weight, per 100 parts by weight of component (A). If component (E) is present at less than 0.01 parts by weight, it is not possible to improve curing and adhesion properties.

Hence the fluorosilicone rubber composition when comprising component (E) may comprise
- (A) 100 parts by weight of a polyorganosiloxane which has a weight average molecular weight greater than 100,000 and comprises fluorinated siloxane units, and non fluorinated siloxane units in the polymer; said fluorinated siloxane units having the formula $(R''Q)_a(R')_b SiO_{(4-a-b)/2}$ and said non-fluorinated siloxane units having the formula $(R')_c SiO_{(4-c)/2}$ where, in said fluorinated and non-fluorinated siloxane units, R" denotes a branched or linear perfluoroalkyl radical having from 1 to 8 carbon atoms, Q denotes a divalent hydrocarbon, hydrocarbon ether or hydrocarbon thioether radical linking the R" radical to a silicon atom through at least 2 carbon atoms, R' denotes a saturated or unsaturated silicon-bonded, monovalent hydrocarbon group, wherein a=1 to 2, b=0-2 and c=0 to 3,
- (B) 5 to 200 parts by weight of a suitable filler;
- (E) a fluorosilicone polymer containing an average of at least two silicon-bonded hydrogen radicals per molecule; and
- (C) 0.1 to 10 parts by weight of an organic peroxide.
- (D) 0 to 20 parts of a second polyorganosiloxane which has a weight average molecular weight greater than 100,000 and the average unit formula $R^1{}_y SiO_{(4-y)/2}$, in which $R^1$ is a substituted or non-substituted monovalent hydrocarbon group which may be unsaturated, but does not contain any fluoro substituents, and y is a number of 1.96 to 2.03.

The applicants have found that the addition of component (F) in the composition in accordance with the present invention not containing component (E) improves adhesion to the fluorosilicone polymer of the present invention, to the high consistency rubber composition. It is believed that the incorporation of the hydrosilylation catalyst causes a reaction with component (E) resulting in a significant enhancement in the adhesion of the two cured products to each other.

Whilst it is preferred for the polymer containing silicon bonded hydrogen groups are present in the fluorosilicone rubber composition this is not essential and the hydrosilylation catalyst may form part of the fluorosilicone rubber composition and a suitable siloxane compound comprising silicon bonded hydrogen atoms may be provided in the high consistency silicone rubber composition.

Any suitable hydrosilylation catalyst may be utilised. Preferably the hydrosilylation catalyst is a platinum group metal based catalyst selected from a platinum, rhodium, iridium, palladium or ruthenium catalyst. Platinum group metal containing catalysts useful to catalyse curing of the present compositions can be any of those known to catalyse reactions of silicon bonded hydrogen atoms with silicon bonded alkenyl groups. The preferred platinum group metal for use as a catalyst to effect cure of the present compositions by hydrosilylation is platinum. Some preferred platinum based hydrosilylation catalysts for curing the present composition are platinum metal, platinum compounds and platinum complexes. Representative platinum compounds include chloroplatinic acid, chloroplatinic acid hexahydrate, platinum dichloride, and complexes of such compounds containing low molecular weight vinyl containing organosiloxanes. Other hydrosilylation catalysts suitable for use in the present invention include for example rhodium catalysts such as $[Rh(O_2CCH_3)_2]_2$, $Rh(O_2CCH_3)_3$, $Rh_2(C_8H_{15}O_2)_3$, $Rh(C_5H_7O_2)_3$, $Rh(C_5H_7O_2)(CO)_2$, $Rh(CO)[Ph_3P]$ $(C_5H_7O_2)$, $RhX_3[(R^3)_2S]_3$, $(R^4{}_3P)_2Rh(CO)X$, $(R^4{}_3P)_2Rh$ $(CO)H$, $Rh_2X_2Y_4$, $H_a Rh_b olefin_c Cl_d$, $Rh\ (O(CO)R^3)_{3-n}$ $(OH)_n$ where X is hydrogen, chlorine, bromine or iodine, Y is an alkyl group, such as methyl or ethyl, CO, $C_3H_{14}$ or 0.5 $C_3H_{12}$, $R^3$ is an alkyl radical, cycloalkyl radical or aryl radical and $R^4$ is an alkyl radical an aryl radical or an oxygen substituted radical, a is 0 or 1, b is 1 or 2, c is a whole number from 1 to 4 inclusive and d is 2, 3 or 4, n is 0 or 1. Any suitable iridium catalysts such as $Ir(OOCCH_3)_3$, $Ir(C_5H_7 O_2)_3$, $[Ir(Z)(En)_2]_2$, or $(Ir(Z)(Dien)]_2$, where Z is chlorine, bromine, iodine, or alkoxy, En is an olefin and Dien is cyclooctadiene may also be used.

Component (F) may be added to the present composition in an amount equivalent to as little as 0.001 part by weight of elemental platinum group metal, per one million parts of the composition. Preferably, the concentration of platinum group metal in the composition is that capable of providing the equivalent of at least 1 part per million of elemental platinum group metal. A catalyst concentration providing the equivalent of about 3-50 parts per million of elemental platinum group metal is generally the amount preferred.

The mixture compound utilized in step (iii) comprises the fluorosilicone rubber composition of step (i) and the high consistency silicone rubber composition of step (ii). The mixture composition may be prepared by any suitable method, such as for example uniformly mixing both of rubber compositions in conventional mixing equipment such as a two-roll kneader-mixer. The ratio of the fluorosilicone rubber composition and the high consistency silicone rubber composition in the mixture composition should be in the range of 40:60 to 60:40. If the ratio of mixing is out of the range of 40:60 to 60:40, the adhesion to the substrate should be impaired.

The applicant has found that such a mixture compund gives surprisingly improved adhesion to both of cured fluorosilicone rubber substrates and cured siloxane rubber substrates.

The present application is of use for any purpose requiring adhesion between the two layers above and for fluorosilicone rubber compositions to be used in situations where improved oil resistance properties are required. One application which relates to both of these potential applications is in the preparation of parts for automobiles such as turbocharger hoses.

A typical turbocharger hose is depicted in FIG. 1. In FIG. 1 there is provided a turbocharger hose (1) having an inner fluorosilicone liner (2), a mixture layer (3), a high consistency silicone rubber inner layer (4), a reinforcing layer (5), typically made from a suitable reinforcing fabric such as aramid or the like and a high consistency silicone rubber outer layer (6).

The present invention will now be described with the aid of examples:

EXAMPLES

The fluorosilicone rubber compositions utilised in the following examples comprised the following (all values are given as parts by weight):

FSR Composition 1

67 parts by weight of hydroxy terminated trifluoropropylmethyl siloxane vinylmethylsiloxane copolymer, having a weight average molecular weight measured by GPC (1weight % toluene solution, RI detector, polystyrene standard) of 610,000 (vinyl group content: 0.13 weight %)

23 parts by weight of fumed silica 8 parts by weight of hydroxyterminated trifluoropropylmethyl siloxane 0.3 part by weight of dimethylvinylsiloxy terminated dimethyl, methylvinyl siloxane 1.8 parts by weight of trimethylsilyl group terminated methyl(perfuluorobutylethyl) siloxane methylhydrogen siloxane copolymer having a viscosity of 35 mm$^2$/s at 25 degree C. (SiH content: 0.5 weight %)

1% by weight of the composition of a paste of 45% 2,5-Dimethyl-2,5-Di(t-butylperoxy)hexane catalyst in silicone oil The high consistency silicone rubber compositions utilised had the following composition:

HCR 1

62 parts by weight dimethylvinyl siloxy terminated dimethyl siloxane methylvinyl siloxane copolymer having a weight average molecular weight measured by GPC (0.1 weight % tetrahydrofuran solution, Reference Index detector, polystyrene standards were utilized to construct a calibration curve for the GPC analysis.) of 680,000 (vinyl group content: 0.02 weight %)

1 parts by weight of dimethylvinyl siloxy terminated dimethyl siloxane methylvinyl siloxane copolymer having a viscosity of 17000 mPa*s at 25 degree C. (vinyl group content: 7.8 weight %)

31.4 parts by weight of fumed silica 5 parts by weight of hydroxy-terminated dimethyl siloxane, viscosity ~21 mPa·s 0.4 parts by weight of hydroxy-terminated dimethyl siloxane methylvinylsiloxane copolymer having a viscosity of 20 mPa·s at 25 degree C. (vinyl group content: 10 weight %)

0.2 parts by weight of mixture of 1,3-divinyl-1,1,3,3-tetramethyldisiloxane platinum complexes and dimethylvinyl siloxy group terminated dimethyl siloxane methyl vinyl siloxane copolymer (platinum metal content: 0.5 weight %)

1% by weight of the composition of a paste of 45% 2,5-Dimethyl-2,5-Di(t-butylperoxy)hexane catalyst in silicone oil Unless otherwise indicated the platinum catalyst comprised 0.5% by weight of the composition of 1,3,-diethenyl-1,1,3,3-tetramethyldisiloxane complexes of platinum.

Sample Preparation

Unless described to the contrary, all samples used in the adhesion tests described in the Examples below were made using the following process:—

Un-cured slabs having dimensions of 150×150×1 mm of fluorosilicone rubber, high consistency rubber, and mixture of fluorosilicone rubber and high consistency rubber were pressed out. These were then coupled together whilst inserting a PET sheet between the layers at one end to allow separation after cure. The coupled sheets were then cured in a 2 mm deep mould for 10 minutes at 170° C. and post cured for 4 hours at 200° C. in a hot air oven. 25 mm strips were then cut using a suitable cutting tool and the resulting test samples were analysed for the level of adhesion between the two layers.

The Adhesion Test

Samples prepared in Examples 1 to 4 were subjected to a 180° peel test using a Instron tensiometer at a crosshead speed of 50 mm min$^{-1}$.

Example 1

In this example un-cured and pre-shaped fluorosilicone rubber (FSR) and high consistency rubber (HCR) samples were combined with mixture of HCR and FSR before curing using the above sample preparation process such that the samples of each compound were cured and adhered to each other in accordance to one embodiment of the invention simultaneously. The mixture of HCR and FSR were prepared by mixing uniformly with 2 roll mill in the proportion described in Table 1.

TABLE 1

| Mixing weight ratio of HCR and FSR (HCR:FSR) | Peel Force with HCR (N/mm) | Peel Force with FSR (N/mm) |
| --- | --- | --- |
| 50:50 | 2.2 | 2.6 |
| 60:40 | 2.3 | 1.9 |
| 80:20 | 3.0 | 1.0 |
| 30:70 | 1.0 | 3.0 |
| 100:0 | Not measured | 1.0 |
| 0:100 | 1.0 | Not measured |

It will be seen in Table 1 that the adhesion of mixture samples of HCR and FSR in the mixing ratio from 60:40 to 40:60 gave significantly improved peel force test results with both of HCR layer and FSR layer.

Physical properties of HCR, FSR, and mixture of them in the mixing weight ratio is 50:50 are shown in table 2. All the physical tests undertaken used the same methods as indicated below:

TABLE 2

| | HCR (parts) | | |
| --- | --- | --- | --- |
| | 100 | | 50 |
| | | FSR (parts) | |
| | | 100 | 50 |
| Specific gravity (ASTM D792) | 1.19 | 1.43 | 1.30 |
| Hardness Shore A (ASTM D2240) | 71.3 | 53.8 | 71.3 |
| Tensile strength (MPa) (ASTM D412 die C) | 11.3 | 10.2 | 10.7 |
| Elongation at break (%) (ASTM D412 die C) | 469 | 439 | 465 |
| Tear resistance (N/mm) (ASTM D624 die B) | 24.8 | 25.7 | 25.5 |

What is claimed is:

1. A method for the adhesion of a layer of fluorosilicone rubber which is curable using a non-hydrosilylation curing process to a layer of silicone rubber which contains no perfluoroalkyl groups and which is curable using a non-hydrosilylation curing process, comprising the steps of:
  i) incorporating either a hydrosilylation catalyst or a siloxane containing at least two silicon bonded hydrogen groups into the fluorosilicone rubber composition prior to curing and;
  ii) incorporating the other of the hydrosilylation catalyst or the siloxane containing at least two silicon bonded hydrogen groups into the silicone rubber composition prior to curing;
  iii) preparing a mixture compound comprising the products of step (i) and step (ii) and having a weight ratio of the product of step (i) to the product of step (ii) in the range of 40:60 to 60:40;
  iv) forming the products of step (i), (ii), and step (iii) into shapes;
  v) bringing the shaped products derived from the mixtures obtained in steps (i) and (ii) into contact with different surfaces of the shaped product derived from the mixture compound of step (iii); and
  vi) adhering the shaped products in contact with each other together by curing the products of step (v).

2. A method in accordance with claim 1 wherein the product of step (iii) remains un-cured prior to step (vi).

3. A method in accordance with claim 1 wherein all of the product of step (i), the product of step (ii), and the product of step (iii) remain un-cured prior to step (vi).

4. A method in accordance with claim 1 wherein pressure is applied on to the interface between the products of step (iv) prior to and/or during step (vi).

5. A method in accordance with claim 1 wherein step (vi) is undertaken at a temperature between room temperature up to 200° C.

6. A method in accordance with claim 1 wherein the hydrosilylation catalyst is a platinum group metal based catalyst selected from a platinum, rhodium, iridium, palladium or ruthenium based catalyst.

7. A method in accordance with claim 1 wherein the siloxane containing at least two silicon bonded hydrogen groups is a linear structure with silicon bonded hydrogen radicals as represented by the formula $Me_3SiO(Me_2SiO)_r[R"CH_2CH_2Si(Me)O]_t(MeHSiO)_zSiMe_3$ wherein each R" may be the same or different and denotes a branched or linear perfluoroalkyl radical having from 1 to 8 carbon atoms, the value of r is zero or greater than zero, and the values of t and z are each greater than zero and are such that the fluorosilicone polymer contains from 1 to 10 mol % hydrogen bonded siloxane units, at least 5 mol % fluorinated siloxane units and the balance being dimethylsiloxane units, and the-chain curing radicals as represented by the formula above wherein the value of r is zero and the values of t and z are each greater than zero and are such that the fluorosilicone polymer contains from 20 to 50 mol % fluorinated siloxane units and has a viscosity of from 10 to 10000 mPa·s at 25° C.

8. A method in accordance with claim 1 wherein the siloxane containing at least two silicon bonded hydrogen groups is selected from $HMe_2SiO(MeHSiO)_m[R"QSi(Me)O]_fSiMe_2H$;
$HMe_2SiO(MeHSiO)_m(R"QHSiO)_fSiMe_2H$;
$R"QMeHSiO(MeHSiO)_m(R"QHSiO)_fSiMeHRQ$;
$Me_3SiO(Me_2SiO)_{0.95m}(MeHSiO)_{0.05m}(R"QMeSiO)_f SiMe_3$;
$HMe_2SiO(Me_2SiO)_m(R"QMeSiO)_fSiMe_2H$;
$HMeR"QSiO(R"QMeSiO)_fSiMeR"QH$;
$Me_2R"QSiO(R"QMeSiO)_{0.95f}(R"QHiSiO)_{0.05f}$; or
$Me_3SiO(Me_2SiO)_m(R"QMeSiO)_{0.90f}(R"QHSiO)_{0.10f} SiMe_3$;

wherein the viscosity of the siloxane containing at least two silicon bonded hydrogen groups ranges from that of a freely flowing liquid to a slowly flowing gum and m and f have values of from zero to 10,000, and wherein each Q may be the same or different and comprises a divalent hydrocarbon containing at least two carbon atoms, a hydrocarbon ether or a hydrocarbon thioether.

9. A method in accordance with claim 1 wherein the fluorosilicone rubber composition comprises
  (A) 100 parts by weight of a polyorganosiloxane which has a weight average molecular weight greater than 100,000 and comprises fluorinated siloxane units, and non fluorinated siloxane units in the polymer; said fluorinated siloxane units having the formula $(R"Q)_a (R')_b SiO_{(4-a-b)/2}$ and said non-fluorinated siloxane units having the formula $(R')_c SiO_{(4-c)/2}$ where, in said fluorinated and non-fluorinated siloxane units, R" denotes a branched or linear perfluoroalkyl radical having from 1 to 8 carbon atoms, Q denotes a divalent hydrocarbon, hydrocarbon ether or hydrocarbon thioether radical linking the R" radical to a silicon atom through at least 2 carbon atoms, R' denotes a saturated or unsaturated silicon-bonded, monovalent hydrocarbon group, wherein a=1 to 2, b=0-2 and c=0 to 3,
  (B) 5 to 200 parts by weight of a filler;
  (E) a fluorosilicone polymer containing an average of at least two silicon-bonded hydrogen radicals per molecule;
  (C) 0.1 to 10 parts by weight of an organic peroxide; and
  (D) 0 to 20 parts of a second polyorganosiloxane which has a weight average molecular weight greater than 100,000 and the average unit formula $R^1_y SiO_{(4-y)/2}$, in which $R^1$ is a substituted or non-substituted monovalent hydrocarbon group which is saturated or unsaturated, and does not contain any fluoro substituents, and y is a number of 1.96 to 2.03.

10. A method in accordance with claim 9 wherein the silicone rubber composition comprises
  (i) an organopolysiloxane of Component (E), (ii) a filler or group of fillers of Component (B), (iii) a curing agent of Component (C); and
    optional additives selected from the group of one or more rheology modifiers, pigments, colouring agents, anti-adhesive agents, plasticizers, adhesion promoters, blowing agents, fire retardants and dessicants.

11. A hose comprising a fluorosilicone rubber adhered to silicone rubber by using the method of claim 1.

* * * * *